June 15, 1954      S. L. PHILLIPS      2,681,028
WELDING RING
Filed April 29, 1950
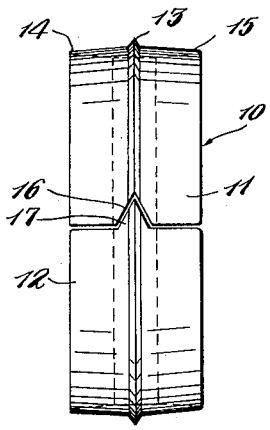
Fig. 1
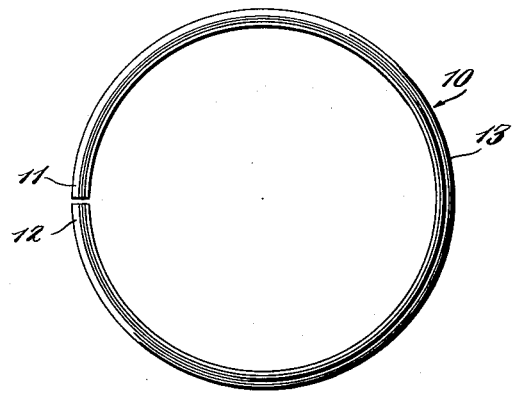
Fig. 2
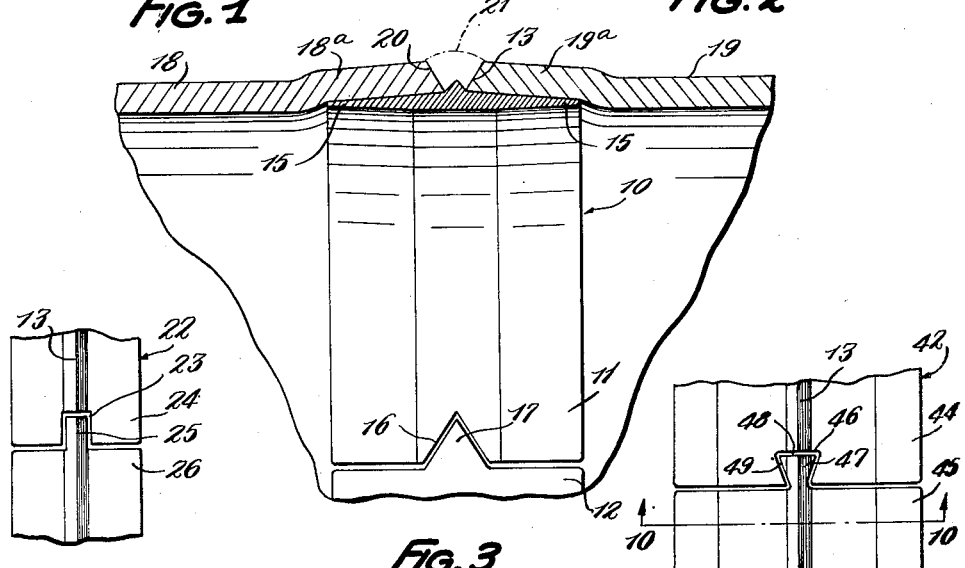
Fig. 4     Fig. 3     Fig. 8
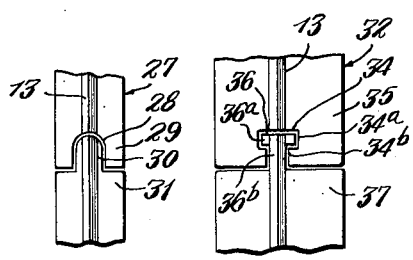
Fig. 5    Fig. 6
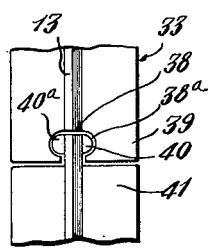
Fig. 7
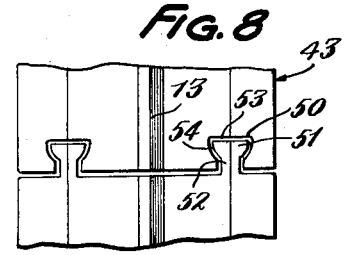
Fig. 9   INVENTOR.
STANLEY L. PHILLIPS
BY Hudson, Boughton
Williams, David & Hoffmann
ATTORNEYS
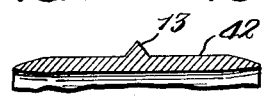
Fig. 10

Patented June 15, 1954

2,681,028

UNITED STATES PATENT OFFICE 2,681,028

WELDING RING

Stanley L. Phillips, Rocky River, Ohio, assignor to Wedge Protectors, Inc., Cleveland, Ohio, a corporation of Ohio Application April 29, 1950, Serial No. 159,095

2 Claims. (Cl. 113—111)

This invention relates to welding rings or so-called chill rings intended for use in making welded joints between pairs of adjacent pipe ends or other tubular articles and, as one of its objects, provides an improved construction for welding rings of this character by which the opposite ends of the annularly curved strip forming such a ring are adapted to be maintained in an aligned relation.

Another object is to provide an improved welding ring of the kind mentioned in which the opposite ends of the annularly curved strip have cooperating aligning elements comprising a recess formed in one of such ends and a projection of substantially the same plan shape carried by the other of such ends and engaging in the recess.

Still another object is to provide an improved welding ring for the purpose indicated in which the cooperating recess and projection constituting the aligning elements are of a dovetail shape for preventing separation of the opposed ends.

Other objects and advantages of this invention will be apparent in the drawing and in the following detailed description.

In the accompanying sheet of drawings,

Fig. 1 is a side elevation of the improved welding ring showing the same in detached relation and illustrating the end aligning means thereof;

Fig. 2 is an end elevation of the ring;

Fig. 3 is a sectional view taken in an axial direction through a welding ring embodying the present invention and through a pair of adjacent pipe ends to be connected thereby and illustrating the manner in which the ring is used;

Figs. 4 to 7 inclusive are partial outside elevational views of welding rings embodying the present invention but showing other specific forms of end aligning means;

Figs. 8 and 9 are partial side elevations showing the end aligning means applied to relatively wide welding rings; and Fig. 10 is a sectional view showing the cross-sectional shape of the wide rings of Figs. 8 and 9.

As shown in Figs. 1 and 2 of the drawing, the improved welding ring 10 comprises a metal strip of an appropriate cross-sectional shape curved to annular or circular form so that the ends 11 and 12 of the strip are in an opposed or circumferentially aligned relation. The strip from which the ring is formed is here shown as having a cross-sectional shape which includes a substantially V-shape ridge or projection 13 on one side thereof and located at substantially the midpoint of the strip. The strip is preferably also of a varying thickness which is a maximum for the intermediate portion of the strip on which the projection 13 is formed and has portions of progressively decreasing thickness which provide relatively thin tapered edges 14 and 15 at opposite ends of the ring. When the strip has been formed to an annular or sleeve shape to constitute the ring 10, the ridge 13 extends in continuous relation circumferentially around the external periphery of the ring and provides an abutment stop adapted to be engaged by the ends of the pipe lengths or other annular members to be welded together.

As already indicated above in a general way, this invention provides aligning means by which the opposed ends 11 and 12 of the welding ring 10 are adapted to be maintained in the desired aligned relation. Figs. 1, 2 and 3 show one form of this aligning means embodied in the welding ring 10 and comprising a recess 16 formed in the ring end 11 and a projection 17 of substantially the same plan shape as the recess and engaging therein. In this form of the aligning means the recess 16 has substantially the shape of a triangle, preferably an isosceles triangle, and the projection 17 which is carried by the end 12 is also an isosceles triangle and engages snugly in the recess 16.

In producing the welding rings 10, blanks or sections of the strip material of the desired cross-sectional shape are cut to appropriate length and are then rolled or otherwise formed to the ring shape. When the lengths are cut from the strip stock, the recess 16 and the projection 17 are formed on a pair of adjacent blank ends during this cutting operation. In this way the recess and projection of this novel aligning means can be obtained without requiring any additional machine operations and without involving any waste of the strip stock material. It will also be seen that the ridge 13 extends into and forms a part of the projection 17 of the ring end 12. The fact that the ridge 13 extends into the projection 17 is an advantage because it reinforces this projection and decreases the likelihood of the projecting becoming bent or otherwise deflected from its proper position.

Fig. 3 illustrates the use of the improved welding ring 10 for connecting a pair of adjacent pipe ends 18 and 19. When used for this purpose, the ring 10 has its ends telescoped into the bell portions 18a and 19a of the pipe ends and spans the joint formed by these pipe ends. The ridge 13 of the welding ring extends radially outwardly between the pipe ends and is engaged thereby as a stop or abutment which maintains the pipe ends in the desired spaced relation defining an annular groove 20 in which a weld 21 can be formed for connecting the pipe ends.

By reason of the aligning means provided by the recess 16 and the projection 17, the ends of the ring 10 will be held in properly aligned relation which will maintain the ring in a truly circular shape and will facilitate the insertion of the ring into the pipe ends. Moreover, when the ring 10 has been inserted into the pipe ends, this aligning means will continue to hold the ring in its circular shape regardless of some shifting of the pipe sections which may take place prior to the forming of the weld. The relatively thin tapered edges 14 and 15 at opposite ends of the ring are desirable because they will lie adjacent the belled portions 18a and 19a of the pipe ends and will not present obstructions to the passage of material through the pipe line.

Figs. 4 to 7 inclusive, show other welding rings generally similar to the welding ring 10 and also embodying the novel feature of the end aligning means.

Fig. 4 shows a welding ring 22 in which the end aligning means is formed by a substantially square flat-sided and flat-ended recess 23 in the ring end 24 and a substantially square flat-sided and flat-ended projection 25 carried by the ring end 26 and of substantially the same size and plan shape as the recess 23 and engaging therein.

Fig. 5 shows a welding ring 27 in which the aligning recess 28 of the ring end 29 is a flat-sided round-ended recess and the projection 30 engaging in such recess and carried by the ring end 31 is a corresponding flat-sided round-ended projection.

Figs. 6 and 7 show welding rings 32 and 33 in which the aligning means is formed by a cooperating recess and projection and in which these elements have a dovetail shape for preventing separation of the ring ends, as well as for maintaining these ends in an aligned or registering relation. In Fig. 6 the recess 34 of the ring end 35 is a flat-sided recess having a substantially rectangular head portion 34a and a slot portion 34b extending outwardly therefrom to the end face of the ring end. The projection 36 of the ring end 37 is of a corresponding shape having a substantially rectangular head portion 36a and a connecting stem portion 36b.

In the welding ring 33 of Fig. 7 the dovetail recess 38 of the ring end 39 has a rounded or oval head portion 38a and the projection 40 of the ring end 41 has a similar rounded or oval shaped head portion 40a.

Figs. 8 and 9 show welding rings 42 and 43 of the same type as the ring 10 but which have a greater axial length and have been formed from relatively wide strip stock so as to have substantially the cross-sectional shape illustrated in Fig. 10. The ring 42 has its adjacent ends 44 and 45 connected and aligned by cooperating dovetail elements comprising the recess 46 and the projection 47. The recess 46 and the projection 47 have a tapered shape defined by a flat transverse end 48 and inwardly converging tapered sides 49.

As shown in Fig. 9 the welding ring 43 employs two sets of aligning recesses and projections 50 and 51 and which are located on opposite sides of the abutment ridge 13. The recess 50 and the projection 51 each comprise a flat-sided stem portion 52 and a head portion having a flat end 53 and inwardly converging arcuate sides 54.

In the joints of all of the welding rings shown in Figs. 1 to 9 inclusive, the opposed ends of the strip have end portions on opposite sides of the abutment ridge which are square-cut end portions or shoulders and define a joint which is substantially straight, axially of the sleeve.

From the foregoing description and the accompanying drawing it will now be readily understood that when welding rings are provided with the cooperating aligning recess and projection herein disclosed, the rings are capable of more satisfactorily serving the purpose for which they are intended. It will also be seen that when these aligning elements are brought into an engaged or interfitting relation at the time of the manufacture of the rings, the ends will be held in a substantially closed and properly aligned relation and this will not only facilitate insertion of the rings into the pipe ends at the place of use but will facilitate the intermediate handling and shipping of the rings because they are less likely to become entangled with each other. It will also be seen that these aligning elements are obtainable on the ring ends without involving any additional machine operations or waste of any stock and, moreover, when the rings are to be inserted into the pipe ends the welder's time will be materially conserved because he will not need to straighten or adjust the ring and can insert the same more readily and accurately into the pipe ends. Additionally, it will be seen that in the case of the aligning means having the dovetail shape the ring ends will also be held in a locked condition which prevents separation thereof after they have been initially aligned with each other.

Although the improved welding rings of this invention have been illustrated and described herein to a somewhat detailed extent it will be understood, of course, that the invention is not to be regarded as being limited correspondingly in scope but includes all changes and modifications coming within the terms of the claims hereof.

Having thus described my invention, I claim:

1. A welding ring for use in a pair of adjacent pipe ends, comprising a sleeve formed by an annularly curved strip having its ends located in opposed substantially meeting relation, said sleeve being adapted for telescoping engagement in said pair of pipe ends and having an external annularly extending substantially radially projecting abutment ridge integrally formed thereon intermediate the ends of the sleeve and adapted to be engaged by said pipe ends, and aligning elements carried by the opposed ends of said strip and cooperating to hold said opposed ends in an aligned relation in the direction of the circumference of said sleeve, one of said aligning elements being a recess formed in and extending entirely through one of said opposed ends in a direction substantially radially of said sleeve and the other of said elements being a projection carried by the other of said opposed ends and having substantially the same plan shape as said recess and engaging in and substantially filling said recess, said aligning elements being located substantially in the plane of said abutment ridge and the projection of said other end constituting an integral circumferential continuation of and being of substantially the same radial thickness as the one of said ends by which it is carried and being formed in part and reinforced by a portion of said abutment ridge, said opposed ends having substantially square-cut end portions on opposite sides of said elements and defining a joint which is substantially straight axially of said sleeve.

2. A welding ring as defined in claim 1 in which said recess and projection are of a dovetail plan shape and form an interlock preventing separation of said opposed ends in a direction circumferentially of said sleeve.

References Cited in the file of this patent

UNITED STATES PATENTS

| Number | Name | Date |
|---|---|---|
| 1,298,100 | Royce | Mar. 25, 1919 |
| 1,715,268 | Ayers | May 28, 1929 |
| 1,981,850 | Fisher | Nov. 27, 1934 |
| 1,987,341 | Kachel | Jan. 8, 1935 |
| 2,330,207 | England et al. | Sept. 28, 1943 |
| 2,472,523 | Dillon | June 7, 1949 |
| 2,506,687 | Scherrer | May 9, 1950 |